(12) United States Patent
McBeath et al.

(10) Patent No.: US 8,249,607 B2
(45) Date of Patent: Aug. 21, 2012

(54) SCHEDULING IN WIRELESS COMMUNICATION SYSTEMS

(75) Inventors: Sean M. McBeath, Keller, TX (US); Hao Bi, Lake Zurich, IL (US); Danny T. Pinckley, Arlington, TX (US); John D. Reed, Arlington, TX (US); Jack A. Smith, Valley View, TX (US)

(73) Assignee: Motorola Mobility, Inc., Libertyville, IL (US)

( * ) Notice: Subject to any disclaimer, the term of this patent is extended or adjusted under 35 U.S.C. 154(b) by 416 days.

(21) Appl. No.: 11/392,077

(22) Filed: Mar. 29, 2006

(65) Prior Publication Data

US 2007/0230412 A1 Oct. 4, 2007

(51) Int. Cl.
*H04W 72/00* (2009.01)
(52) U.S. Cl. ........................... 455/450; 370/330
(58) Field of Classification Search .............. 455/450, 455/464
See application file for complete search history.

(56) References Cited

U.S. PATENT DOCUMENTS

| | | | |
|---|---|---|---|
| 4,817,190 A | 3/1989 | Comroe et al. |
| 5,014,345 A | 5/1991 | Comroe et al. |
| 5,483,672 A | 1/1996 | Sasuta |
| 5,530,914 A | 6/1996 | McPheters |
| 5,946,306 A | 8/1999 | Talarmo |
| 6,115,390 A | 9/2000 | Chuah |
| 6,219,341 B1 | 4/2001 | Varanasi |
| 6,327,254 B1 | 12/2001 | Chuah |
| 6,427,075 B1 | 7/2002 | Burg et al. |
| 6,473,467 B1 | 10/2002 | Wallace et al. |
| 6,744,743 B2 | 6/2004 | Walton et al. |
| 6,765,969 B1 | 7/2004 | Vook et al. |
| 6,804,528 B1 | 10/2004 | Laroia et al. |
| 6,845,100 B1 | 1/2005 | Rinne |
| 6,850,540 B1 | 2/2005 | Peisa et al. |
| 6,859,443 B1 | 2/2005 | Mushkin |
| 6,963,544 B1 | 11/2005 | Balachandran et al. |
| 7,088,671 B1 | 8/2006 | Monsen |
| 7,110,349 B2 | 9/2006 | Branlund et al. |
| 7,400,898 B2 | 7/2008 | Kang et al. |

(Continued)

FOREIGN PATENT DOCUMENTS

EP 0619662 A2 10/1994

(Continued)

OTHER PUBLICATIONS

Farooq Khan, VoIP Models for 802.20 System Performance Evaluation [Retrieved from IEEE 802 LAN/MAN Standards Committee, URL: www.ieee802.org/20/Contribs/C802.20.04-12.ppt.], IEEE 802.20 Interim Meeting, Jan. 12, 2004.

(Continued)

*Primary Examiner* — Marcos Batista
(74) *Attorney, Agent, or Firm* — Roland K. Bowler, II (57) ABSTRACT

A wireless communication infrastructure entity assigns a plurality of schedulable wireless communication entities to a group wherein each entity is assigned a location within the group. The infrastructure entity indicates which of the plurality of schedulable wireless communication entities assigned to the group have been assigned a radio resource, for example in a first bitmap (510), and indicates radio resource allocation policy information (520) and indicates a weighting for each assigned wireless communication entity, for example, in a second bitmap (530), to the schedulable wireless communication entities that have been assigned a radio resource.

22 Claims, 10 Drawing Sheets

U.S. PATENT DOCUMENTS

| | | | |
|---|---|---|---|
| 7,423,997 | B2 | 9/2008 | Kuchibhotla et al. |
| 7,471,932 | B2 | 12/2008 | Wu et al. |
| 7,570,596 | B2 | 8/2009 | Pan et al. |
| 7,616,610 | B2 | 11/2009 | Kuchibhotla et al. |
| 2002/0114309 | A1* | 8/2002 | Chow et al. ............ 370/347 |
| 2003/0013451 | A1 | 1/2003 | Walton |
| 2003/0063619 | A1* | 4/2003 | Montano et al. ............ 370/443 |
| 2003/0086366 | A1 | 5/2003 | Branlund et al. |
| 2003/0220119 | A1 | 11/2003 | Terry |
| 2004/0082356 | A1 | 4/2004 | Walton et al. |
| 2005/0007990 | A1 | 1/2005 | Beckmann et al. |
| 2005/0073976 | A1 | 4/2005 | Fujii |
| 2005/0105487 | A1 | 5/2005 | Rudolf et al. |
| 2005/0122999 | A1 | 6/2005 | Scherzer et al. |
| 2005/0141467 | A1 | 6/2005 | Pan et al. |
| 2005/0286402 | A1 | 12/2005 | Byun et al. |
| 2006/0002336 | A1 | 1/2006 | Stanwood et al. |
| 2006/0013185 | A1 | 1/2006 | Seo et al. |
| 2006/0092972 | A1* | 5/2006 | Petrovic et al. ............ 370/469 |
| 2006/0093067 | A1 | 5/2006 | Jalali et al. |
| 2006/0146863 | A1 | 7/2006 | Spinar et al. |
| 2006/0153312 | A1 | 7/2006 | Yun et al. |
| 2006/0198338 | A1* | 9/2006 | Ishii et al. ............ 370/329 |
| 2006/0274779 | A1* | 12/2006 | Shoham ............ 370/450 |
| 2007/0010268 | A1 | 1/2007 | Kim et al. |
| 2007/0053288 | A1 | 3/2007 | Stern-Berkowitz et al. |
| 2007/0117579 | A1 | 5/2007 | Cai et al. |
| 2007/0153690 | A1 | 7/2007 | Stanwood et al. |
| 2008/0305819 | A1* | 12/2008 | Chun et al. ............ 455/509 |
| 2010/0020716 | A1 | 1/2010 | Kuchibhotla et al. |
| 2010/0309891 | A1 | 12/2010 | Kuchibhotla et al. |

FOREIGN PATENT DOCUMENTS

| | | | |
|---|---|---|---|
| EP | 0660633 | A2 | 12/1994 |
| EP | 1005243 | A1 | 5/2000 |
| JP | 62-501813 | A | 7/1987 |
| JP | 11-298533 | A | 10/1999 |
| JP | 2005-210684 | A | 8/2005 |
| WO | 0197539 | A2 | 12/2001 |
| WO | 2004075495 | A1 | 9/2004 |
| WO | 2004100566 | A2 | 11/2004 |

OTHER PUBLICATIONS

Banani Roy, Dynamic Subchannel Allocation in a Multi-Cellular OFDMA System based on Interference Measurements and Traffic Situation [Retrieved from Queen's University, <Url:http://www.cs.queensu.ca/-broy/MasterThesis_Banani.pdt>], Master Thesis, Dec. 14, 2005.

3GPP; ETSI TS 125 308 V6.3.0 (Dec. 2004) Technical Specification; Universal Mobile Telecommunications System (UMTS); Utra High Speed Downlink Packet Access (HSDPA); Overall Description; Stage 2 (3GPP TS 25.308 Version 6.3.0 Release 6).

3GPP; ETSI TS 125 309 V6.4.0 (Sep. 2005) Technical Specification; Universal Mobile Telecommunications System (UMTS); FDD Enhanced Uplink; Overall Description; Stage 2 (3GPP TS 25.309 Version 6.4.0. Release 6).

Cohen et al., Scheduling of Voice Packets in a Low-Bandwidth Shared Medium Access Network; Department of Computer Schience Technion Israel; 23 Pages, Mar. 2003.

Cohen et al., A Generic Quantitative Approach to Scheduling of Synchronous Packets in a Shared Medium Wireless Access Network.; 11 Pages, Jul. 2004.

Howon Lee, et al., Extended RTPS for VOIP Services; IEEE 802.16 Broadband Wireless Access Working Group; IEEE C802.16e-04/522; 8 Pages; Nov. 4, 2004.

Japanese Patent Application No. 2008-534548, Office Action dated Sep. 21, 2010, 5 pages.

Chinese Patent Application No. 200680036793.6, Notification of the First Office Action dated Sep. 21, 2010, 14 pages.

EPC Patent Application No. 06803446.1, Rejection dated Oct. 1, 2010, 7 pages.

United States Patent and Trademark Office, "Notice of Allowance and Fee(s) Due" for U.S. Appl. No. 12/574,487 dated Aug. 8, 2011, 6 pages.

* cited by examiner

SCHEDULING IN WIRELESS COMMUNICATION SYSTEMS

FIELD OF THE DISCLOSURE

The present disclosure relates generally to wireless communications and more particularly to scheduling wireless communication terminals, for example, mobile handsets, in wireless communication systems and corresponding methods.

BACKGROUND OF THE DISCLOSURE

In wireless communication systems, it is generally desirable to reduce overhead associated with signaling for voice and data services, system information, control, etc. In traditional cellular systems such as that defined by the High Rate Packet Data (HRPD) standard and the Universal Mobile Telecommunications System (UMTS), bearer establishment is enabled through dedicated signaling. The bearer defines radio parameters, for example, time slot, frequency, code, etc., associated with a channel during a call. In voice communications for example a dedicated channel is assigned to each user. In High Speed Downlink Packet Access (HSDPA) systems, transport format and modulation/coding parameters (TFRI) are provided using dedicated control signaling on a shared control channel, wherein the shared control channel also signals the code channel assigned to the user.

In some data only (DO) systems, voice is served using the internet protocol (VoIP). It is known to improve such systems for VoIP traffic using hybrid automatic repeat request (HARQ) error correction schemes and smaller packet sizes. While VoIP users have the same benefits of advanced link adaptation and statistical multiplexing as data users, the greatly increased number of users that may be served because of the smaller voice packet sizes places a burden on control mechanisms of the system. It can be easily envisioned, for example, that 30 times as many voice packets could be served in a given frame than data packets. There are typically about 1500 bytes for data and about 15-50 bytes for voice, depending on the vocoder rate. Present resource allocation policies however are not designed to handle such a large number of allocations efficiently given the varying size of the voice packet.

It is known to group multiple voice users together which share a set of time frequency resources. It is also known to use bitmap signaling to efficiently allocate portions of the shared resource to the set of voice users sharing the same time frequency resource. However, these techniques are deficient in two ways. First, they do not address allocating different amounts of time-frequency resources for different sizes of voice packets. Second, they do not address how to effectively use the shared time frequency resources if there are fewer users than available time frequency resources. Thus, there is a need for efficiently and flexibly allocating resources of varying size to a group of users. In packet based systems the term "data" is meant to signify payload information for any service, voice or data.

The various aspects, features and advantages of the present disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
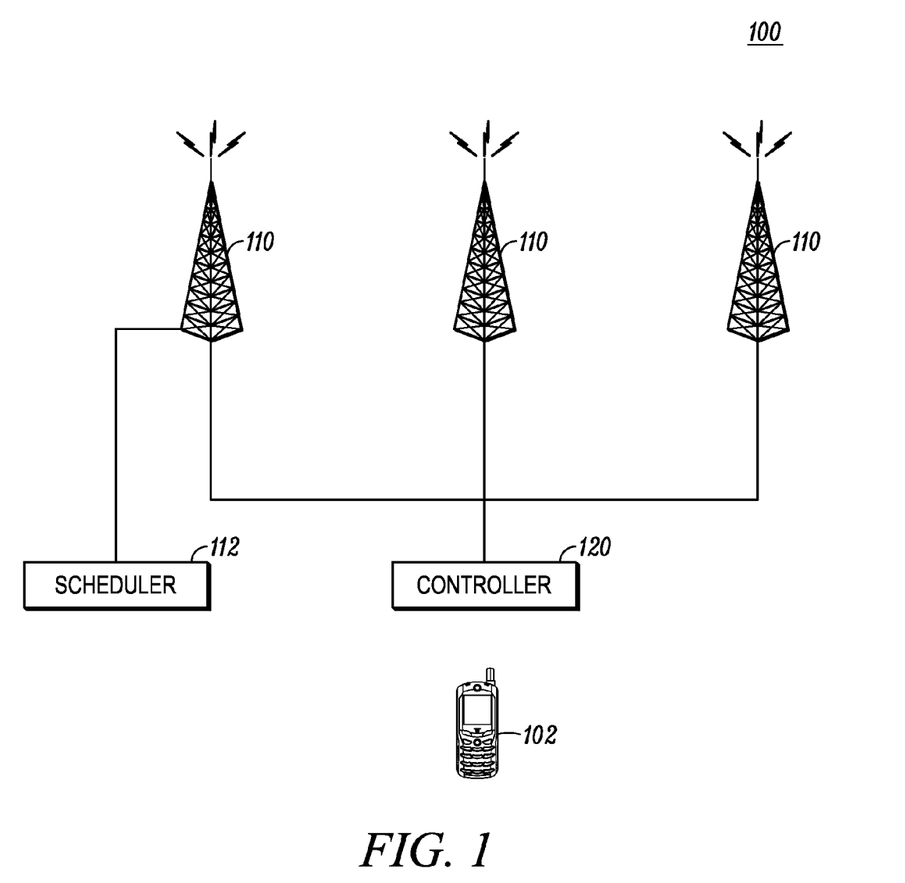
FIG. 1 is an illustrative wireless communication network.

FIG. 1 is a wireless digital communication system 100 comprising a plurality of base transceiver stations 110 providing wireless communication service including voice and/or data service to wireless terminals 102 over corresponding regions or cellular areas. The base transceiver stations, also referred to by other names such as a "Node B" and access network (AN) depending on the system type, are communicably coupled to a controller 120 and to other entities that are not shown but are well known by those having ordinary skill in the art. In FIG. 1, each base transceiver station includes a scheduling entity 112 for radio resource scheduling among the wireless communication terminals within the network. Exemplary communication systems include, but are not limited to, developing Universal Mobile Telecommunications System (UMTS) networks, Evolved Universal Terrestrial Radio Access (E-UTRA) networks, Evolved High Rate Packet Data (E-HRPD) networks, and other orthogonal frequency division multiplexing (OFDM) based networks.

E-HRDP, E-UTRA and other communication protocols are being developed to support delivery of voice services over a packet domain, in contrast to the traditional delivery of voice over a circuit switched domain. Thus there is interest in schemes that support voice traffic over a shared radio channel, wherein multiple users share the time and frequency resources of the radio interface. In order to attain a significant increase in capacity with E-HRPD and E-UTRA, efficient radio resource allocation schemes will likely be required to accommodate voice traffic. In these and other applications, including data applications, it is generally desirable that control signaling overhead be minimized while offering flexibility to the scheduler at the network. In a general sense, it is useful to define a mechanism to efficiently signal resource allocation and related control channel information to multiple terminals applicable to a broadband wireless system, relying on shared channels for delivery of any service using packet based transmission.

Figure 2:
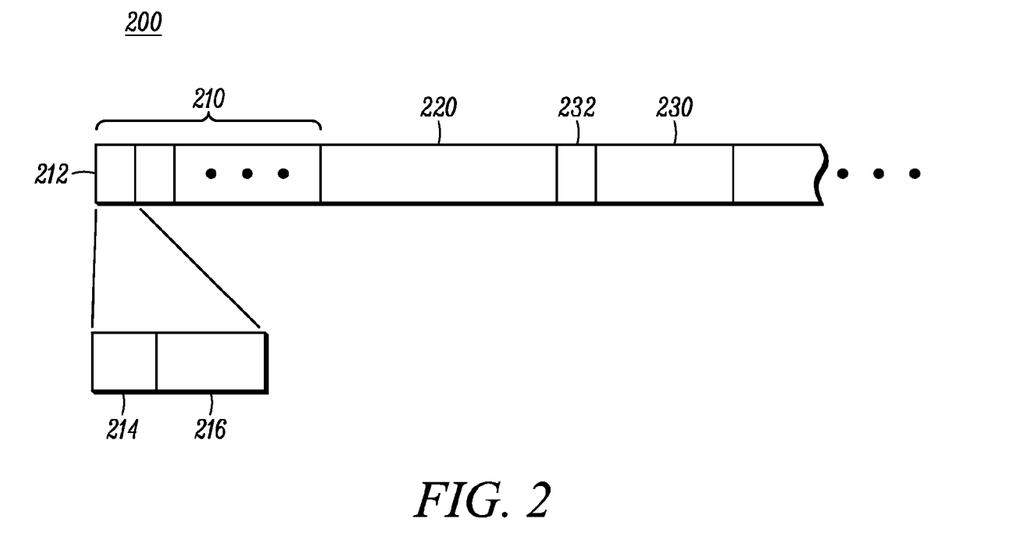
FIG. 2 is an illustrative sequence of radio frames each comprising a plurality of time slots.

FIG. 2 illustrates a sequence of radio frames 200 useful for communicating in wireless digital communication systems. In FIG. 2, the frame sequence generally comprises a plurality of frames 210, 220, 230 . . . , wherein each frame comprises a plurality of time slots. For example, frame 210 comprises a time slot 212 having a resource assignment control channel portion within a control channel portion 214 and a data channel portion 216. In some embodiments, the frames constitute a repeating sequence of frames, wherein the repeating sequence may be periodic or aperiodic.

Figure 3:
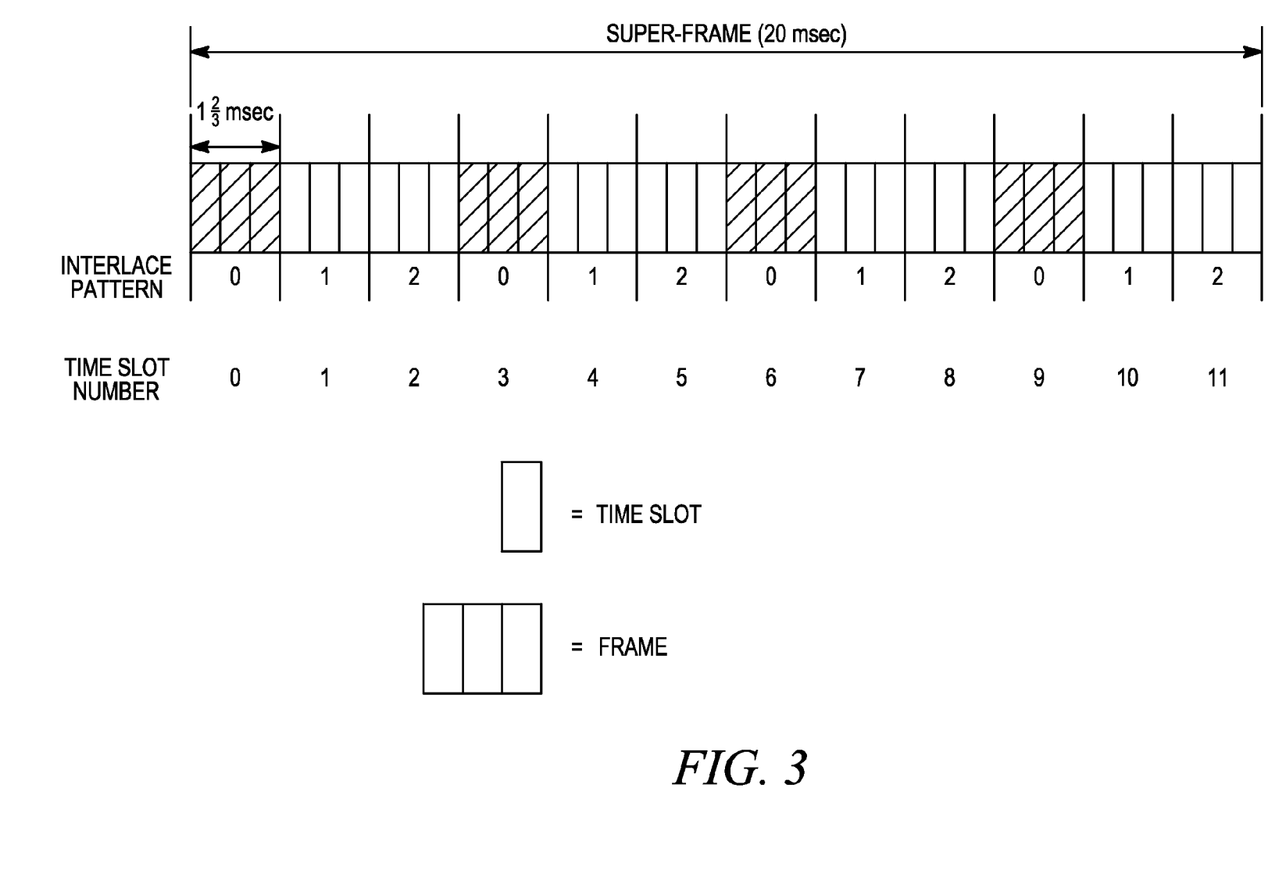
FIG. 3 is an illustrative example of a sequence of repeating radio frames each comprising a plurality of time slots.

FIG. 3 illustrates a sequence of repeating radio frames, wherein three time slots are grouped to form a frame. In FIG. 3, each time slot is 5/9 msec and each frame is 5/3 msec, although the timing may be different in other embodiments. An interlace pattern is defined as a repeating sequence of frames. For systems employing synchronous HARQ (S-HARQ), the initial and subsequent transmissions occur in the same interlace pattern. In this illustrative example, 12 frames, denoted frame 0 through 11, occupy a 20 msec time interval, which is defined as a super-frame and is the duration of a vocoder frame for many wireless standards.

For orthogonal frequency division multiple access (OFDMA) systems, such as those being considered for E-UTRA and E-HRPD, the frequency domain is divided into subcarriers. For example, for a 5 MHz OFDMA carrier, there may be 464 subcarriers, where the subcarrier spacing is 9.6 kHz. Similarly, a time slot is divided into multiple OFDM symbols. For example, a time slot may occupy 5/9 msec and contain 5 OFDM symbols, where each symbol occupies approximately 110.68 usec. The subcarriers are grouped to form frequency selective resource elements (FSRE) and frequency distributive resource elements (FDRE). An FSRE is a group of contiguous subcarriers, while an FDRE is a group of noncontiguous sub-carriers.

In one embodiment, a scheduler or other infrastructure entity in a wireless communication system groups wireless communication terminals in one or more groups for scheduling purposes. Any entity or terminal that may be scheduled by the scheduler is referred to as a schedulable wireless communication entity. In one embodiment, the entities or terminals can be grouped based on radio channel conditions associated with the terminals, for example, channel quality information reported by the terminals, Doppler reported by the terminal, distance from the serving cell, among others. In another embodiment, the terminals are grouped based on one or more terminal operating characteristics other than participation in a common communication session. Exemplary terminal operating characteristics include power headroom of the terminals, macro diversity considerations, terminal capability, service of the terminals, and codec rate, among others. In yet another embodiment, terminals with an active VoIP session are grouped together. Once the scheduler establishes a group of wireless communication terminals, the BTS sends an indication to each wireless terminal of its position in the group and an indication of the identifier for the group. The identifier for the group is used if the BTS wants to send control information valid for the entire group. For example, the BTS may change the frequency allocation for the group by sending an indication of the group identifier and an indication of the new frequency allocation. The indications can be sent for each wireless terminal separately or can be sent for a plurality of wireless terminals at once. For example, the BTS can transmit a list of wireless terminal unique identifiers along with a group identifier. The first terminal in the list of unique identifiers is assigned the first position, the second terminal in the list of unique identifiers is assigned the second position, etc. The unique identifier can be a mobile communication device or wireless terminal identification number, a subscriber identity, or any other identifier that can be used to uniquely identify a wireless terminal. For example, the unique identifier can be a medium access control index (MAC Index). As another example, the BTS can transmit the unique identifier for one wireless terminal, an identification of the group identifier, an indication of the wireless terminal's position within the group. The indications can be transmitted on a control channel.

For services where statistical multiplexing and HARQ are used, it is advantageous for the first transmissions in a series of HARQ transmissions for different wireless terminals to occur at different times. This allows more wireless terminals to share the same set of resources. Consequently, the scheduler may also assign each wireless terminal an interlace offset, which indicates to the wireless terminal when it will receive its first transmission in a series of HARQ transmissions. For example, referring again to FIG. 3, interlace offset '00' is defined when the first transmission occurs in slot 0, interlace offset '01' is defined when the first transmission occurs in slot 3, interlace offset '10' is defined when the first transmission occurs in slot 6, and interlace offset '11' is defined when the first transmission occurs in slot 9. If a wireless terminal is assigned interlace offset '10', its first transmission in a series of HARQ transmissions will occur in slot 6, its second transmission will occur in slot 9, its third transmission will occur in slot 0 of the next super frame, and the fourth transmission will occur in slot 3 of the next super frame. A similar relationship exists for each interlace offset.

Figure 4:
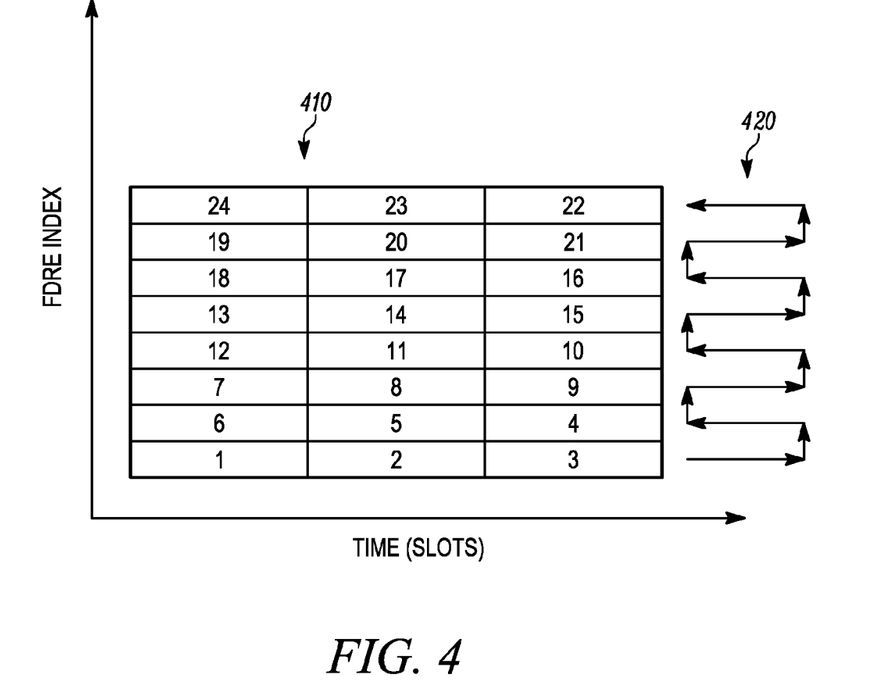
FIG. 4 is an illustrative example of a set of shared resources.

For each group of schedulable wireless communication entities, the scheduler can assign a set of time-frequency resources to be shared by the entities or terminals in the group. FIG. 4 shows an example of a set of shared resources. In FIG. 4, the shared resources 410 are three time slots and eight FDREs. If a block is defined as one time slot in the time domain and one FDRE in the frequency domain, then there are 24 blocks, denoted 1 through 24. As will be discussed later, each wireless terminal determines its portion of the shared resource based on the assignments for other wireless terminals. Therefore, it is necessary to define the order in which the resources are to be allocated. In FIG. 4, an illustrative ordering 420 is given which results in the blocks being numbered 1 through 24. The set of shared resources can be repeated using an interlace pattern as described in FIG. 3. For example, the 24 resources can be repeated in each frame of interlace pattern 0 in FIG. 3.

The indication of the group identifier, group position, and interlace offset can be signaled from the BTS to the wireless terminal using a control channel. Further, the control channel can be transmitted in any time slot prior to the beginning time slot of the set of shared resources or in the same time slot that the set of shared resources begins. The set of shared resources can begin in the same slot the control channel is transmitted, can have a fixed starting point relative to the time slot that the control channel is transmitted, or can be explicitly signaled in the control channel.

Figure 5:
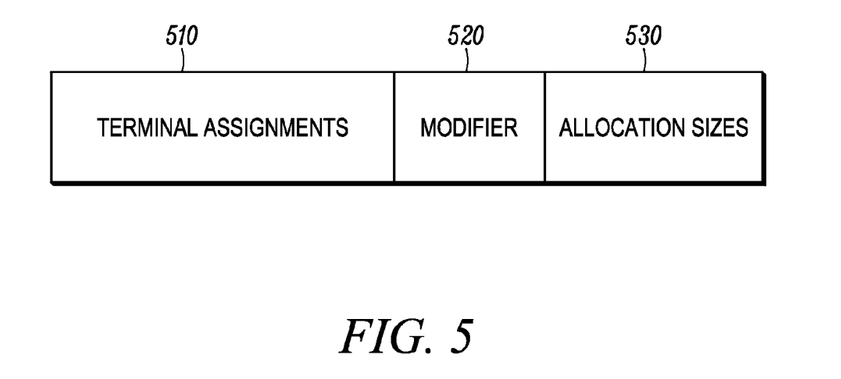
FIG. 5 is a schematic diagram of resource assignment information.

Once the scheduler assigns a plurality of wireless terminals to a group of wireless terminals, assigns each wireless terminal a position (also called location) within the group, assigns a set of shared resources to the group of wireless terminals, the scheduler must indicate to the set of wireless terminals which wireless terminals are active in a given time period and the number of assigned resources assigned to each wireless terminal. FIG. 5 is an exemplary technique for assigning resources to wireless terminals. In FIG. 5, a first field 510 indicates which wireless terminals are assigned at least one of the shared resources in the corresponding set of shared resources. For example, 510 could be a first bitmap, where the position of the wireless terminal within the group of wireless terminals corresponds to its bitmap position. For example, the wireless terminal assigned position 0 determines if it is assigned one of the shared resources using position 0 of the bitmap, the wireless terminal assigned position 1 determines if it is assigned one of the shared resources using position 1 of the bitmap, etc. While a bitmap position is typically one bit, it is understood that a bitmap position can be more than one bit. For example, a bitmap position can consist of two bits, where the wireless terminal assigned position 1 determines if it is assigned one of the shared resources using the first two bits of the bitmap, the wireless terminal assigned position 2 determines if it is assigned one of the shared resources using the third and fourth bits in the bitmap, etc. When one bit per wireless terminal is used in the bitmap, active users can be indicated using either a '0' or a '1', where inactive users are indicated using the opposite state. In the illustrative examples, active users are indicated using a '1'.

In FIG. 5, the modifier 520 indicates radio resource allocation policy to the schedulable wireless communication entities that have been assigned a radio resource, wherein the radio resource allocation policy specifies how the assigned radio resources are distributed among the schedulable wireless communication entity to which the radio resources have been assigned. In one embodiment, the modifier 520 indicates to the set of wireless terminals how to interpret the terminal assignment and allocation size information. For example, the modifier 520 can include two bits, where '00' indicates to the wireless terminals that the allocation sizes field 530 is null and further indicates that all wireless terminals indicated in the terminal assignment field 510 are assigned the same size resource, '01' indicates to the wireless terminals that the allocation sizes field 530 is null and further indicates that the set of shared resources is to be equally divided among the set of wireless terminals indicated in the terminal assignment field 510, '10' indicates to the wireless terminals that the allocation sizes field 530 contains an entry for each wireless terminal indicating the number of assigned resources, and '11' indicates to the wireless terminal that the allocation sizes field 530 contains an entry for each wireless terminal indicating a weighting and that the resources are to be divided using a weighted division. Note that the system or a particular service type can be configured to always use the same assignment scheme, which would eliminate the need for the modifier 520. Further, when a group is established, the BTS can indicate to the group of wireless terminals to always use the same assignment scheme, thereby eliminating the need for the modifier 520.

Thus generally the allocation sizes field 530 indicates radio resource assignment weighting information to the schedulable wireless communication entities to which radio resources have been assigned. In one embodiment, the radio resource assignment weighting information indicates a proportion of radio resources assigned to each schedulable wireless communication entities to which radio resources have been assigned. In another embodiment, the radio resource assignment weighting information indicates a specified number or size of radio resources assigned to each schedulable wireless communication entity to which radio resources have been assigned. In some embodiments, the radio resource assignment weighting information also includes at least one of vocoder rate, modulation, and coding information.

In one embodiment, the radio resource assignment weighting information is communicated to the schedulable wireless communication entities in a bitmap including a bitmap location for each schedulable wireless communication entity to which radio resources have been assigned, but not bitmap locations for schedulable wireless communication entities to which radio resources have not been assigned. Each bitmap location may include one or more bits. Providing vocoder rate, modulation, or coding information in the allocation sizes field bitmap does not necessarily require additional bits. For example, the size of the allocation can imply a particular modulation. For example, an assignment of two resources can imply QPSK modulation, while an assignment of one resource can imply 16-QAM modulation.

In another embodiment, one or more of the first bitmap positions corresponds to a multiple user packet. Multiple user packets are formed by concatenating multiple data sets, each typically intended for a different user, into a single larger data set of multi-user data which is then encoded into a single packet. As an example, all eighth rate voice frames could be concatenated into a multiple user packet, and assigned the last position in the first bitmap. Each wireless terminal not indicated in the first bitmap could then assume that it is served in the eighth rate multiple user packet.

Figure 6:
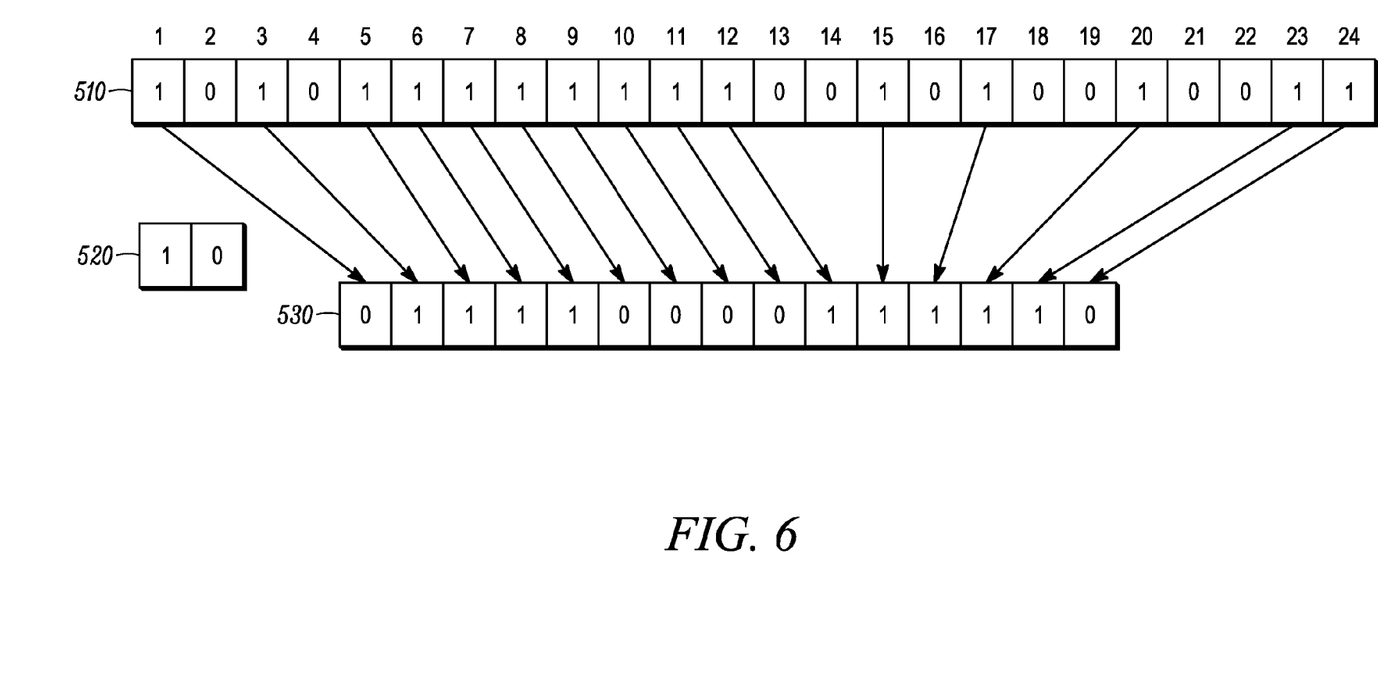
FIG. 6 illustrates a resource assignment bitmap.

As an illustrative example, FIG. 6 shows exemplary first and second bitmaps for allocating resources. In FIG. 6, 24 wireless terminals are assigned to a group of wireless terminals and are assigned group positions 1 through 24, which correspond to positions 1 through 24 in the first bitmap. Active wireless terminals are indicated with a '1' in the first bitmap. The first bitmap is the terminal assignments field 510 from FIG. 5. The modifier 520 is '10' indicating to the wireless terminals that the allocation sizes field 530 contains an entry for each wireless terminal indicating the number of assigned resources. The allocation sizes field 530 is a second bitmap, wherein the Nth active user in the first bitmap corresponds to the Nth position in the second bitmap. A '0' in the allocation size field indicates that 1 resource is allocated to the corresponding wireless terminal and a '1' indicates that 2 resources are allocated to the corresponding wireless terminal. Note that non-linear mappings are also possible. For example, a '0' could indicate that 1 resource is allocated to the corresponding wireless terminal and a '1' could indicate that 4 resources are allocated to a wireless terminal. In another embodiment, the allocation sizes field contains two bits per wireless terminal and indicates the vocoder frame format for VoIP transmissions and the size of the allocation. For example, eighth rate frames could be indicated as '00' and can be allocated 1 resource, quarter rate frames could be indicated as '01' and can be allocated 1 resource, half rate frames could be indicated as '10' and can be allocated 2 resources, and full rate frames can be indicated as '11' and can be allocated 4 resources. In another embodiment, the allocation sizes field contains two bits per wireless terminal and indicates one of a possible set of vocoder rates. For example, 1, 2, 3, or 6 resources can be indicated using '00', '01', '10', '11', respectively. If '00' is indicated, 1 resource is assigned and the vocoder rate is either eighth rate or quarter rate. If '01' is indicated, 2 resources are assigned and the vocoder rate is either quarter rate or half rate. If '10' is indicated, 3 resources are assigned and the vocoder rate is either half rate or full rate. If '11' is indicated, 6 resources are assigned and the vocoder rate is full rate. If multiple vocoder rates are possible, the wireless terminal must determine the transmitted vocoder rate, either using blind detection or the correlation properties of the various vocoder rates. In another embodiment, the allocations sizes field 530 can also include and implicitly imply the modulation or coding used by the BTS. Returning to FIG. 6, the wireless terminal assigned group position 1, denoted $WT_1$, and therefore position 1 in the first bitmap is an active wireless terminal as indicated by the '1' in bitmap position 1. Therefore, $WT_1$ determines its allocation size using the first position in the second bitmap 530. Since a '0' is indicated in the first position in the second bitmap, $WT_1$ is allocated 1 resource. The wireless terminal assigned group position 2, denoted $WT_2$, and therefore position 2 in the first bitmap is not an active wireless terminal as indicated by the '0' in the first bitmap. Therefore, $WT_2$ is not allocated any resources and is not found in the second bitmap 530. The wireless terminal assigned group position 3, denoted $WT_3$, and therefore position 3 in the first bitmap is an active wireless terminal as indicated by the '1' in bitmap position 3. $WT_3$ is the second active wireless terminal indicated in the first bitmap and, therefore, $WT_3$ determines its allocation size using the second position in the second bitmap 530. Since a '1' is indicated in the second position in the second bitmap, $WT_3$ is allocated 2 resources. These allocation policies are repeated for all 24 wireless terminals. Note that the second bitmap could be the same size as the first bitmap, which would eliminate the need to map assigned terminals in the first bitmap to positions in the second bitmap.

Figure 7:
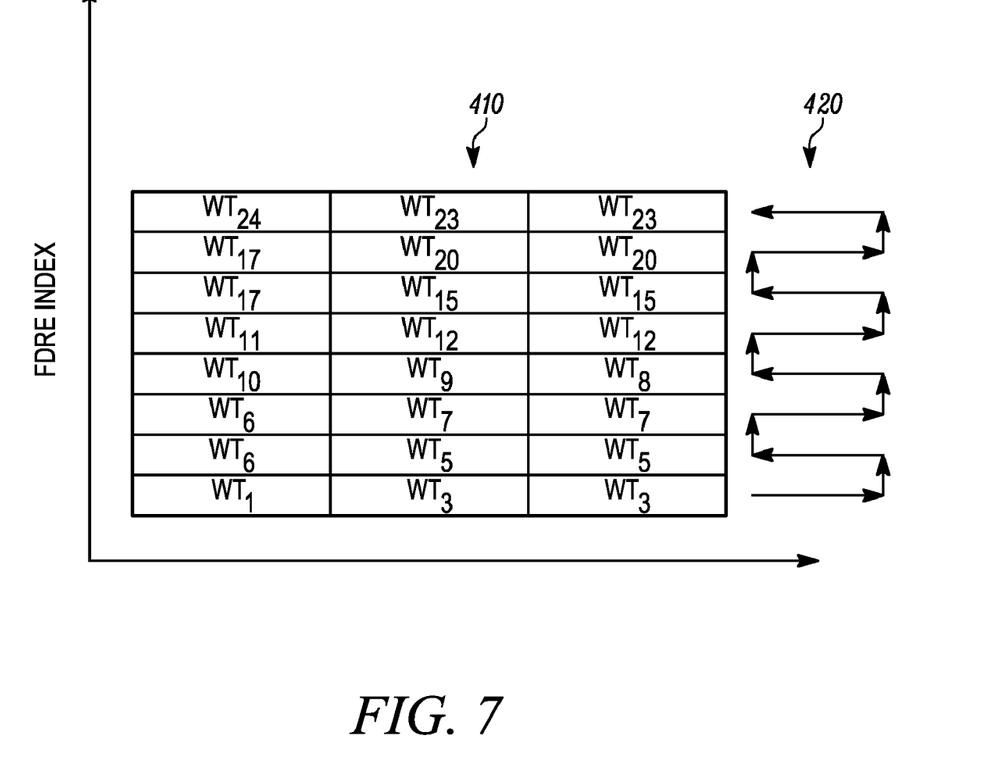
FIG. 7 illustrates shared resources and an ordering pattern.

Combining the allocation policies illustrated in FIG. 6 and the set of shared resources 410 and ordering pattern 420 illustrated in FIG. 4, each wireless terminal can determine its portion of the shared resources as depicted in FIG. 7. The first active wireless terminal, $WT_1$, is assigned one resource, and since it's the first wireless terminal allocated, it is allocated resource 1 of FIG. 4. The second active wireless terminal, $WT_3$, is assigned two resources. $WT_3$ must sum the number of resources allocated to wireless terminals with a smaller position in the second bitmap. In this case, $WT_3$ must determine that one resource was previously assigned. Therefore, $WT_3$ is assigned resource 2 and 3 of FIG. 4. The third active wireless terminal, $WT_5$, is assigned two resources. $WT_5$ must sum the number of resources allocated to wireless terminals with a smaller position in the second bitmap. In this case, $WT_5$ must determine that 3 resources were previously assigned (1 for $WT_1$ and 2 for $WT_3$). Therefore, WT5 is assigned resources 4 and 5 of FIG. 4. This process is repeated for all wireless terminals.

Figure 8:
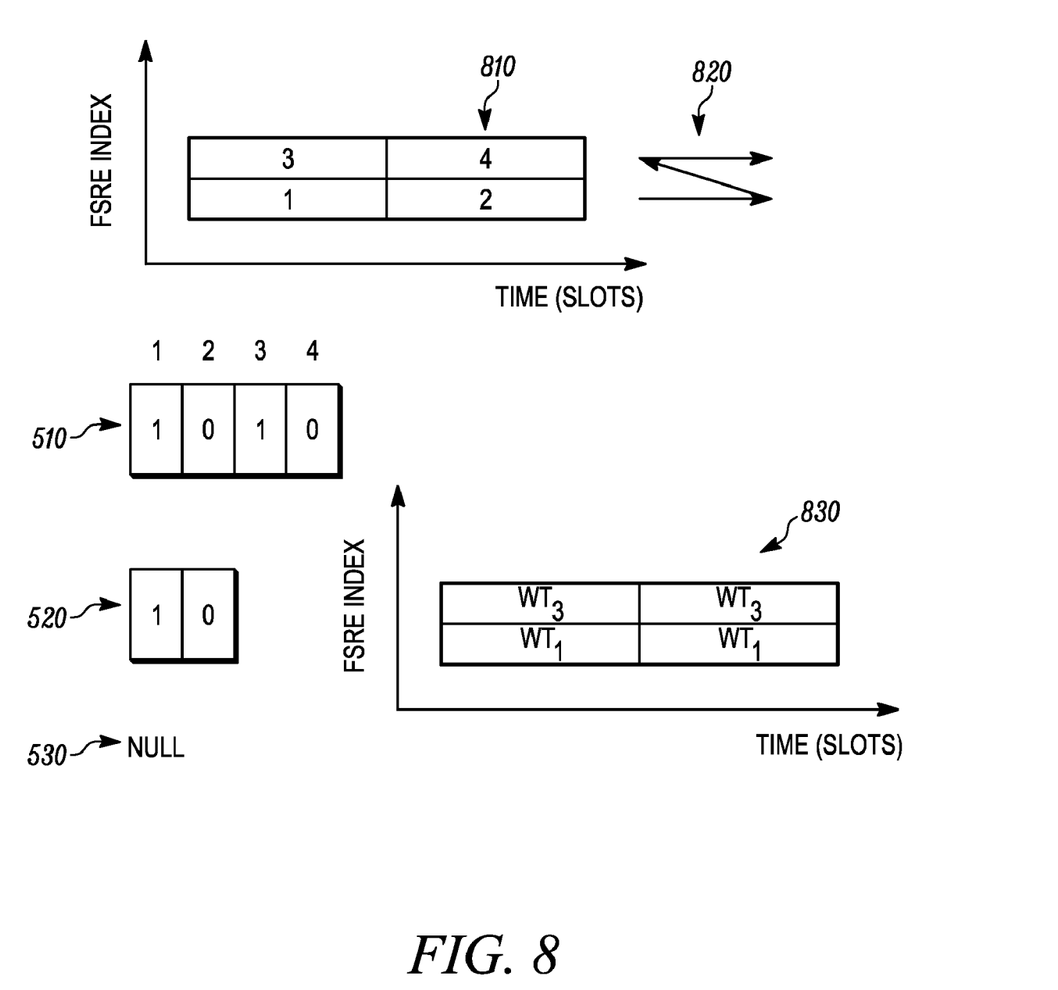
FIG. 8 illustrates shared resources and assignment information.

In contrast to the explicit allocation example illustrated in FIG. 7, the set of shared resources can also be divided equally or in a weighted manner as discussed above. For example, in FIG. 8, an illustrative example is given in which the modifier 520 instructs the wireless terminals to equally divide the set of shared resources. In FIG. 8, there are four shared resources 810 consisting of two FSREs and two time slots. One FSRE by one time slot is denoted as a block. The set of shared resources are subject to the ordering pattern 820. The terminal assignment 510 indicates that there are two active wireless terminals, $WT_1$ and $WT_3$. Since the modifier 520 instructs $WT_1$ and $WT_3$ to equally divide the resources, then each wireless terminal is allocated two resources. Each wireless terminal must know the policy for dividing the resources. For example, $WT_1$ can be allocated the first and second resources, and $WT_3$ can be allocated the third and fourth resources as depicted at 830. Alternatively, the resources can be allocated in a round robin manner. In this way, $WT_1$ can be allocated the first resource, $WT_3$ the second resource, $WT_1$ the third resource, and $WT_3$ the fourth resource. Any sharing scheme can be used as long as the wireless terminals know the scheme.

Figure 9:
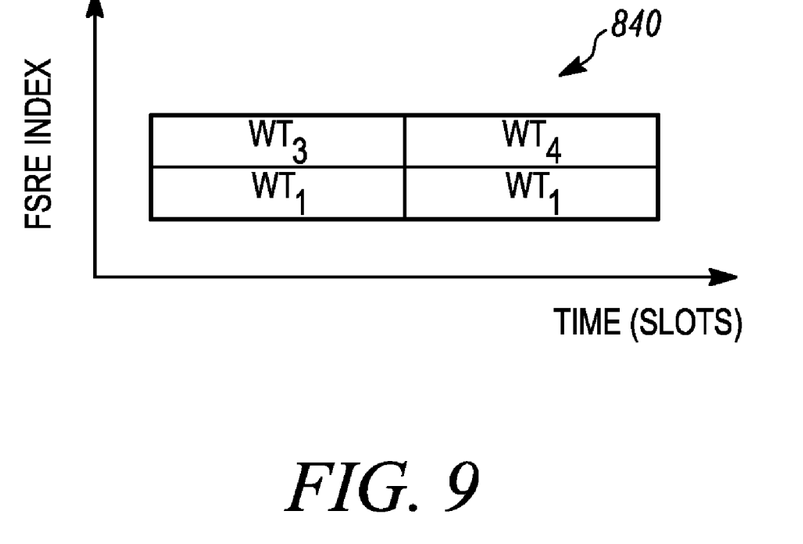
FIG. 9 illustrates an alternative resource assignment.
Figure 10:
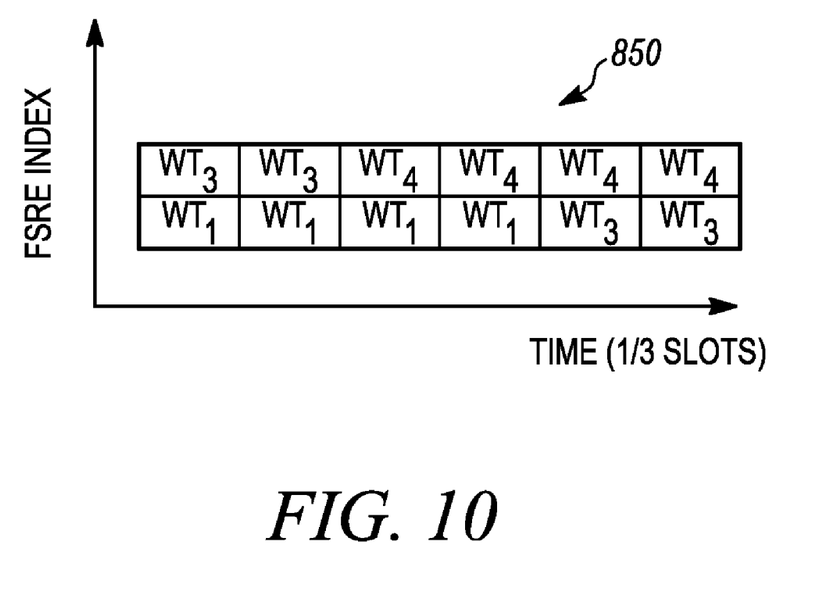
FIG. 10 illustrates another alternative resource assignment.

In FIG. 9, there are three active wireless terminals and four shared resources. When the number active wireless terminals divided by the number of shared resources is not an integer, then an additional allocation policy is needed. At 840, $WT_1$ is assigned two resources, while $WT_3$ and $WT_4$ are each assigned one resource. In this example, a round robin technique is used to determine the number of assigned resources, while the resources are allocated consecutively. Such an unequal division is necessary if the blocks cannot be shared by a plurality of users. On the other hand, if a block can be shared, then a more equal distribution is possible. In FIG. 10, at 850, a block is divided into three sub-blocks, where each sub-block is 1 FSRE by 1/3 slot. In this example, $WT_1$ is assigned the first four sub-blocks, $WT_3$ is assigned the second four sub-blocks, and $WT_4$ is assigned the last four sub-blocks.

The dividing of resources can occur in the time domain, as in 850, frequency domain, or in both domains simultaneously. For example, referring again to the set of shared resources 810 in FIG. 1, the wireless terminals know the number of subcarriers and OFDM symbols in the entire set of shared resources, and therefore can divide the set of shared resources on a subcarrier and OFDM symbol basis. For example, if there are 29 subcarriers in the FSREs in 810 and 5 OFDM symbols in the time slots of 810, then there are 29*2*5*2=580 total time-frequency resources. In this way, if there are three active wireless terminals, then two wireless terminals are allocated 193 time-frequency resources and one wireless terminal is allocated 194 time-frequency resources. Like in the example above, the wireless terminals must know the order in which the resources are to be divided. Generally, certain OFDM symbols or subcarriers will be allocated for pilot and control, leaving the remaining OFDM symbols and subcarriers for data. For example, suppose that 1 of 5 OFDM symbols per time slot for all subcarriers is allocated for pilot and control, leaving 4 OFDM symbols for all subcarriers for data. Referring again to 810, there are 29*2*4*2=464 total time-frequency resources. In this way, if there are three active wireless terminals, then two wireless terminals are allocated 155 time-frequency resources allocated for data and one wireless terminal is allocated 154 time-frequency resources allocated for data.

Figure 11:
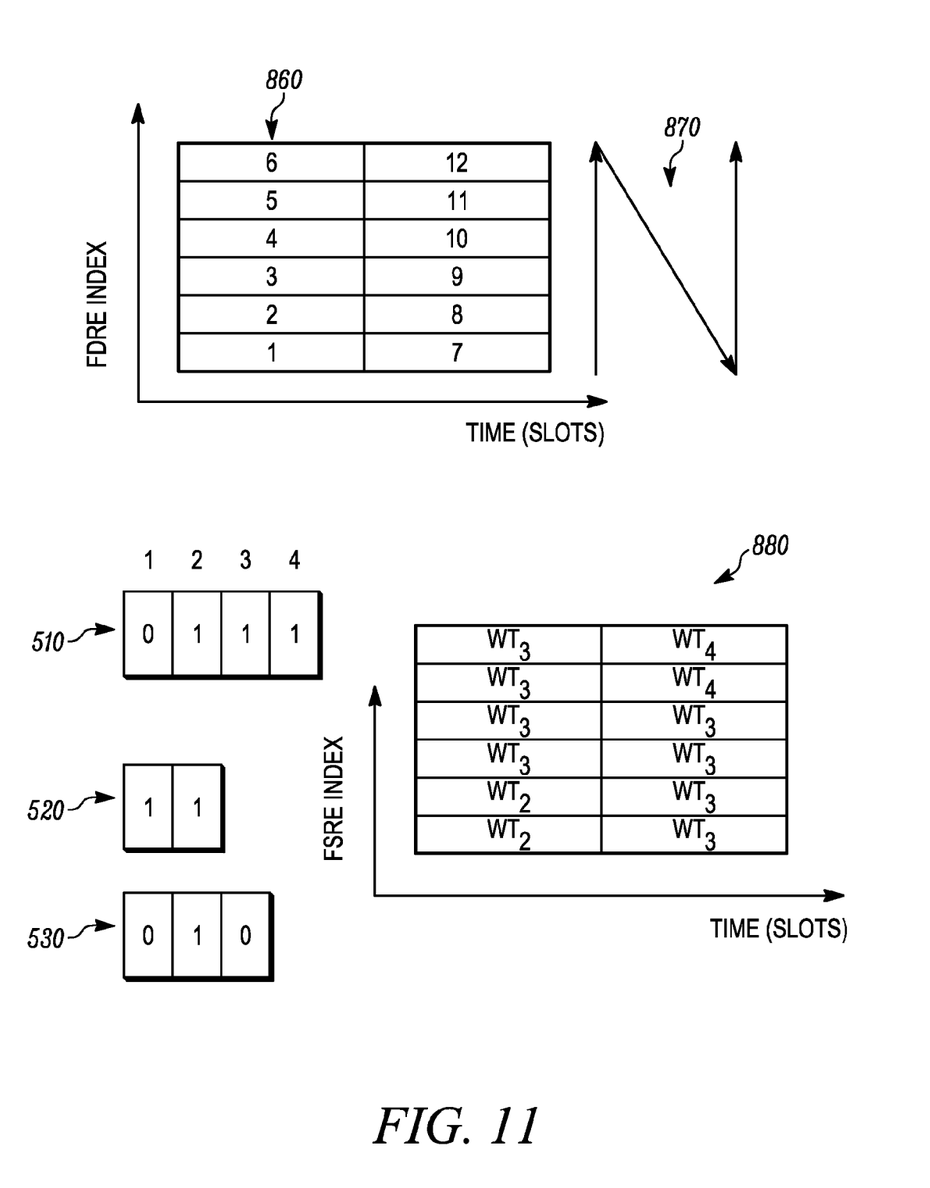
FIG. 11 illustrates another alternative resource assignment and ordering pattern.

FIG. 11 is an illustrative example in which the modifier 520 instructs the wireless terminals to perform a weighted division of the set of shared resources. In FIG. 11, there are twelve shared resources 860 consisting of six FDREs and two time slots. One FDRE by one time slot is denoted as a block. The set of shared resources are subject to the ordering pattern 870. In the example at 880, there are three active wireless terminals indicated $WT_2$, $WT_3$, and $WT_4$ as indicated by the terminal assignment field 510. Since the modifier 520 instructs $WT_2$, $WT_3$, and $WT_4$ to perform a weighted division of the resources, then each wireless terminal must first divide the total number of shared resources by the total weighting to determine how the resources are distributed. In this illustrative example, the weighting is contained in the allocation sizes field 530, where a '0' indicates that a weighting of 1 is used, and a '1' indicates that a weighting of 4 is used. Referring to FIG. 11, the total weighting indicated in 530 is '010' which is 1+4+1=6. Since there are twelve total shared resources, each wireless terminal determines the number of resources it is allocated by dividing the total number of shared resources by the total weighting and then multiplying by its own weighting value. For example, $WT_2$ determines that it is allocated two resources according to (12/6)*1=2, $WT_3$ determines that it is allocated eight resources according to (12/6)*4=8, and $WT_4$ determines that it is allocated two resources according to (12/6)*1=2. Based on the number of allocated resources, each wireless terminal determines its position in the set of shared resources as described previously using the wrapping pattern 920. For example, $WT_2$ is allocated resources 1 and 2, $WT_3$ is allocated resources 3-10, and $WT_4$ is allocated resources 11-12 as depicted at 880.

Figure 12:
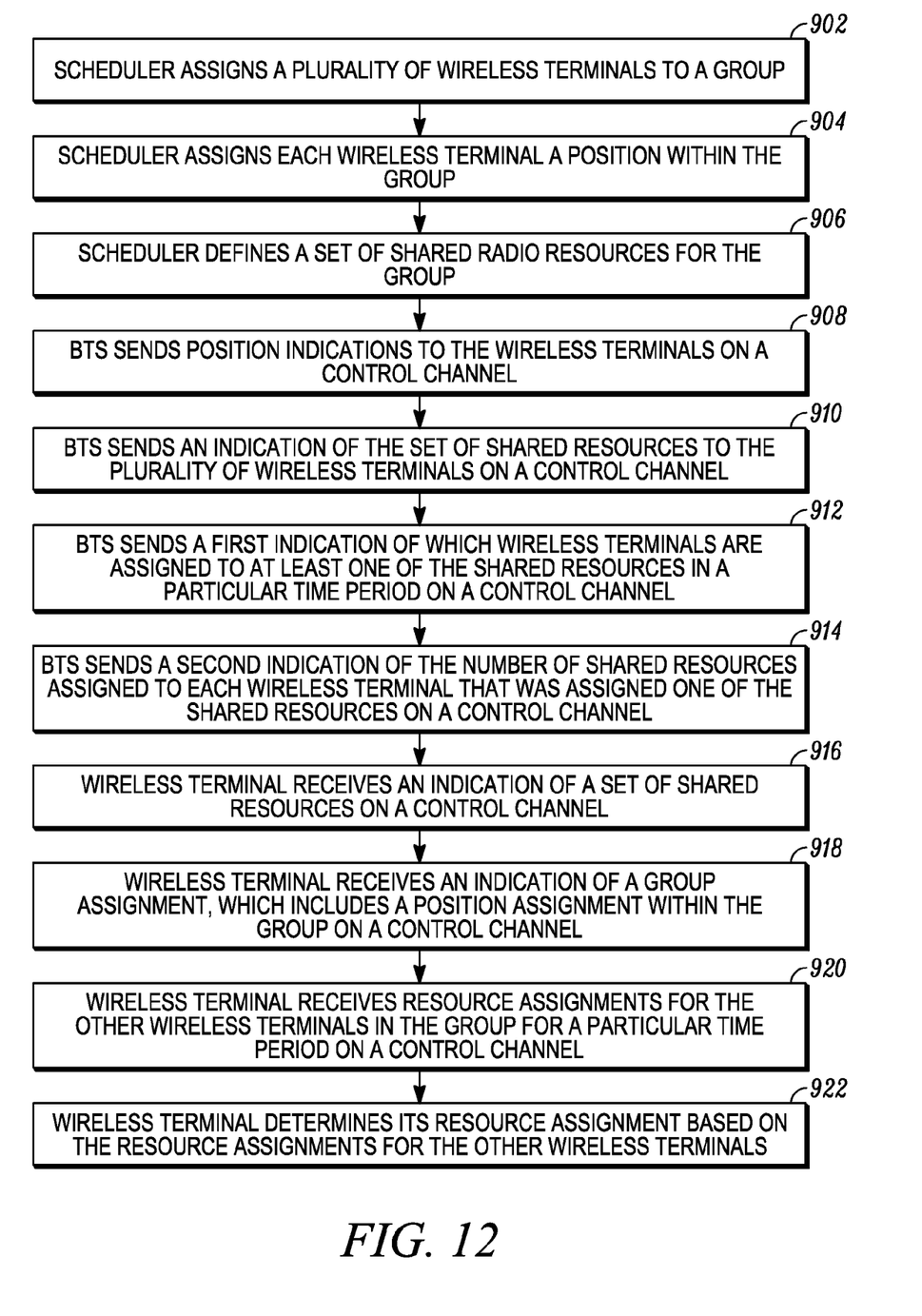
FIG. 12 is a process diagram.

In FIG. 12, at 902, a scheduler assigns a plurality of schedulable wireless communication entities to group, and at 904 each entity is assigned a position (also called location) within the group. At 906, the scheduler assigns a shared radio resource, for example, a time frequency resource, to the group. At 908, a BTS sends position indications to the terminals in the group. In general, each wireless terminal receives a unique position indication, which allows it to determine its assignment within a group of shared resources. For example, one wireless terminal is assigned the first position, another wireless terminal is assigned the second position, etc. In this way, the first wireless terminal which is assigned a resource is assigned the first resource, the second terminal which is assigned a resource is assigned the second resource, etc. At 910, the BTS sends an indication of the share radio resources assigned to the group. At 912, the BTS sends a first indication, for example, a terminal assignment bitmap as discussed above, of which wireless terminals are assigned radio resources in a particular time period. In FIG. 9, at 914, the BTS sends a second indication of the number of shared resources assigned to each wireless terminal that was assigned one of the shared resources. The second indication may be the allocation sizes bitmap. In addition to 912 and 914, the BTS may send a modifier to inform the wireless terminal of the allocation policy. The information transmitted by the BTS at 902-914 is typically sent on a control channel. At 916, the schedulable entity receives the indication of the shared resource sent at 910. At 918, the schedulable entity receives the indication of a group assignment, at 920 the entity receives the resource assignment, and at 922 the entity determines its resource assignment based on the resource assignment of the other entities in the group.

While the present disclosure and the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication infrastructure entity comprising:
    a transceiver;
    a processor coupled to the transceiver,
    the processor configured to assign a plurality of schedulable wireless communication entities to a group, each schedulable wireless communication entity assigned a position within a bit map associated with the group;
    the processor configured to indicate which of the plurality of schedulable wireless communication entities assigned to the group have been assigned a radio resource based on values in the assigned positions of the bitmap;
    the processor configured to indicate radio resource allocation policy information to the schedulable wireless communication entities that have been assigned a radio resource, the radio resource allocation policy information specifying how the assigned radio resources are distributed among the schedulable wireless communication entities to which the radio resources have been assigned.

2. The entity of claim 1,
    the processor configured to assign the group a shared time frequency resource,
    the processor configured to indicate to the plurality of schedulable wireless communication entities assigned to the group which of the schedulable wireless communication entities have been assigned radio resources of the shared time frequency resource.

3. The entity of claim 1, the radio resource allocation policy information indicating that the radio resources assigned to the schedulable wireless communication entities are of the same size.

4. The entity of claim 1, the radio resource allocation policy information indicating that the assigned radio resources are distributed equally among the schedulable wireless communication entities to which the radio resources have been assigned.

5. The entity of claim 1, the radio resource allocation policy information indicating that a number of radio resources assigned to the schedulable wireless communication entities is specified in an allocation bitmap.

6. The entity of claim 1, the radio resource allocation policy information indicating that a weighting for dividing the radio resources assigned to the schedulable wireless communication entities is specified in an allocation bitmap.

7. A wireless communication network infrastructure entity comprising:
    a transceiver;
    a processor coupled to the transceiver,
    the processor configured to assign a plurality of schedulable wireless communication entities to a group, each schedulable wireless communication entity assigned a position within a bit map associated with the group;
    the processor configured to indicate which of the plurality of schedulable wireless communication entities assigned to the group have been assigned a radio resource based on values in the assigned positions of the bitmap;
    the processor configured to indicate radio resource assignment weighting information to the schedulable wireless communication entities to which radio resources have been assigned.

8. The entity of claim 7, the processor configured to indicate the radio resource assignment weighting information by indicating a proportion of radio resources assigned to each of the schedulable wireless communication entities to which radio resources have been assigned.

9. The entity of claim 7, the processor configured to indicate the radio resource assignment weighting information by indicating a number of radio resources assigned to each schedulable wireless communication entity to which radio resources have been assigned.

10. The entity of claim 7, the processor configured to indicate the radio resource assignment weighting information in a bitmap, the bitmap includes a bitmap location for each schedulable wireless communication entity to which radio resources have been assigned, the bitmap does not include a bitmap location for schedulable wireless communication entities to which radio resources have not been assigned.

11. The entity according to claim 10, wherein the bitmap has more than one bit for each location.

12. The entity according to claim 7, the processor configured to indicate the radio resource assignment weighting information by indicating modulation and coding information.

13. The entity method according to claim 7, wherein each unique weighting indication further indicates one or more vocoder frame formats.

14. A schedulable wireless communication entity assigned to a group with a plurality of other schedulable wireless communication entities wherein each schedulable wireless communication entity is assigned a position within a bit map associated with the group and wherein the group is assigned a shared radio resource, the entity comprising:

a transceiver;

a processor coupled to the transceiver, the entity configured to receive an indication that the entity has been assigned a radio resource, the indication is based on a value of the assigned position within the bitmap;

the entity configured to receive radio resource allocation policy information indicating how the shared radio resources are distributed among the schedulable wireless communication entities to which the radio resources have been assigned.

15. The entity of claim 14, the entity configured to receive the indication that the schedulable wireless communication entity has been assigned a radio resource in a first bitmap wherein each schedulable wireless communication entity of the group corresponds to a location within the bitmap.

16. The entity of claim 14, the entity configured to receive radio resource assignment weighting information in a second bitmap, wherein each schedulable wireless communication entity to which radio resources have been assigned has a location within the second bitmap and wherein schedulable wireless communication entities to which radio resources have not been assigned do not have a location in the second bitmap.

17. The entity of claim 14, the entity configured to use the radio resource allocation policy information to determine whether the radio resources assigned to the schedulable wireless communication entities are of the same size.

18. The entity of claim 14, the entity configured to use the radio resource allocation policy information to determine whether the assigned radio resources are distributed equally among the schedulable wireless communication entities to which the radio resources have been assigned.

19. The entity of claim 14, the entity configured to use the radio resource allocation policy information to determine that a number of radio resources assigned to the schedulable wireless communication entities is specified in a second bitmap.

20. The entity of claim 14, the entity configured to use the radio resource allocation policy information to determine that weighting information for dividing the radio resources assigned to the schedulable wireless communication entities is specified in a second bitmap.

21. A wireless communication scheduling entity comprising:

a transceiver;

a processor coupled to the transceiver, the processor configured to assign a plurality of schedulable wireless communication entities to a group to which a shared time frequency resource is assigned, each schedulable wireless communication entity assigned a position within a bit map associated with the group;

the processor configured to assign a repeating sequence of frames to the group, each of the plurality of schedulable wireless communication entities assigned a frame within the repeating sequence in which its first transmission in a series of hybrid automatic repeat request transmissions will occur using the shared time frequency resource.

22. The entity of claim 21, the processor configured to send an indication of when the first transmission will occur relative to a known boundary.

* * * * *